United States Patent
Melrose

(10) Patent No.: US 7,782,003 B2
(45) Date of Patent: Aug. 24, 2010

(54) POSITIONAL INDICIA MISPLACEMENT COMPENSATION

(75) Inventor: Thomas O. Melrose, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 801 days.

(21) Appl. No.: 11/592,340

(22) Filed: Nov. 3, 2006

(65) Prior Publication Data

US 2007/0096678 A1   May 3, 2007

Related U.S. Application Data

(60) Provisional application No. 60/732,995, filed on Nov. 3, 2005.

(51) Int. Cl.
G05B 1/06 (2006.01)

(52) U.S. Cl. .................. 318/560; 318/561; 318/562; 360/77.04; 360/78.06

(58) Field of Classification Search .......... 318/560, 318/561, 562, 652, 632; 360/78.06, 78.07, 360/78.09, 77.04
See application file for complete search history.

(56) References Cited

U.S. PATENT DOCUMENTS

| | | | | |
|---|---|---|---|---|
| 4,679,103 | A | | 7/1987 | Workman |
| 5,699,207 | A | * | 12/1997 | Supino et al. ............ 360/78.09 |
| 5,714,831 | A | * | 2/1998 | Walker et al. .......... 310/316.01 |
| 5,760,990 | A | | 6/1998 | Ukani et al. |
| 5,774,297 | A | | 6/1998 | Hampshire et al. |
| 5,781,365 | A | * | 7/1998 | Romano et al. .......... 360/78.06 |
| 5,825,582 | A | * | 10/1998 | Supino et al. ............ 360/78.06 |
| 5,835,300 | A | | 11/1998 | Murphy et al. |
| 5,847,895 | A | * | 12/1998 | Romano et al. .......... 360/78.09 |
| 5,936,792 | A | * | 8/1999 | Kobayashi et al. ....... 360/78.07 |
| 6,003,811 | A | * | 12/1999 | Trikha ....................... 244/78.1 |
| 6,046,879 | A | | 4/2000 | Hampshire |
| 6,141,175 | A | | 10/2000 | Nazarian et al. |
| 6,185,467 | B1 | * | 2/2001 | Romano et al. ................ 700/28 |
| 6,236,895 | B1 | * | 5/2001 | Romano et al. ................ 700/28 |
| 6,490,120 | B1 | * | 12/2002 | Burton et al. ............ 360/78.07 |
| 6,549,362 | B1 | | 4/2003 | Melrose et al. |
| 6,570,733 | B1 | * | 5/2003 | Waugh et al. ............ 360/78.06 |
| 6,614,615 | B1 | * | 9/2003 | Ju et al. .................... 360/78.04 |
| 6,636,377 | B1 | * | 10/2003 | Yu et al. ................... 360/78.07 |
| 6,646,824 | B1 | * | 11/2003 | Takaishi et al. .......... 360/77.02 |
| 6,741,057 | B2 | * | 5/2004 | Iwashita et al. ............. 318/632 |
| 6,771,454 | B2 | * | 8/2004 | White et al. ............. 360/77.03 |
| 6,785,084 | B2 | | 8/2004 | Szita |
| 6,798,611 | B1 | * | 9/2004 | Romano et al. .......... 360/78.09 |

(Continued)

*Primary Examiner*—Paul Ip
(74) *Attorney, Agent, or Firm*—Fellers, Snider, et al.

(57) ABSTRACT

Apparatus and method for compensating for positional indicia misplacements in the positioning of a control object, such as with servo seam misplacements on a data storage device storage medium. An actual position for the control object is determined in relation to a corrected commanded position of the control object and a corrected position error of the control object. The corrected commanded position is determined in relation to a gain error and an actual commanded position, and the corrected position error determined in relation to the gain error and an actual position error. Preferably, an actual position error of the control object is next determined in relation to the actual position, and the control object is moved to reduce the actual position error. The positional indicia preferably comprise AB and CD seams of ABCD servo dibit patterns on a recording surface.

20 Claims, 6 Drawing Sheets

U.S. PATENT DOCUMENTS

| | | |
|---|---|---|
| 6,965,491 B1 | 11/2005 | Perlmutter et al. |
| 7,525,754 B2 * | 4/2009 | Melrose et al. .......... 360/77.04 |
| 2002/0089779 A1 * | 7/2002 | Heydt et al. .............. 360/77.08 |
| 2003/0076066 A1 * | 4/2003 | Iwashita et al. ............. 318/638 |
| 2003/0195643 A1 * | 10/2003 | Knirck et al. ................. 700/69 |
| 2006/0147237 A1 * | 7/2006 | Hayashi et al. ............... 400/76 |
| 2006/0176604 A1 * | 8/2006 | Atsumi et al. ................. 360/75 |
| 2007/0096678 A1 * | 5/2007 | Melrose ...................... 318/652 |

* cited by examiner

POSITIONAL INDICIA MISPLACEMENT COMPENSATION

RELATED APPLICATIONS

The present application makes a claim of domestic priority under 35 U.S.C. §119(e) to U.S. Provisional Patent Application No. 60/732,995 filed Nov. 3, 2005.

FIELD OF THE INVENTION

The claimed invention relates generally to the field of control systems and more particularly, but not by way of limitation, to compensating for positional indicia misplacements in positioning a control object, such as with servo seam misplacements on a data storage device storage medium.

BACKGROUND

The ongoing commercialization of data processing devices has generally resulted in successive generations of devices having ever higher rates of functionality and interconnectivity. To this end, mass storage capabilities are being increasingly incorporated into a number of different types of devices, particularly with hand-held portable devices such as cell phones, digital cameras, personal data assistants (PDAs), etc.

A disc drive is one type of data storage device that generally stores data on one or more rotatable magnetic recording media. A corresponding array of data transducers (heads) are selectively moved across the surfaces of the media to transduce data therewith. Servo data patterns are often provided on the media to provide transducer positional feedback during such data I/O operations.

With the continued demand for data processing devices with ever higher levels of performance, there remains a continual need for improvements in the manner in which servo control data are processed. Without limitation, it is to these and other improvements that preferred embodiments of the present invention are generally directed.

SUMMARY OF THE INVENTION

Preferred embodiments of the present invention are generally directed to an apparatus and method for positional indicia misplacements in the positioning of a control object, such as with servo seam misplacements on a data storage device storage medium.

In accordance with preferred embodiments, an actual position for the control object is determined in relation to a corrected commanded position of the control object and a corrected position error of the control object.

The corrected commanded position is determined in relation to a gain error and an actual commanded position, and the corrected position error is determined in relation to the gain error and an actual position error.

Preferably, an actual position error of the control object is next determined in relation to the actual position, and the control object is moved to reduce the actual position error.

The control object preferably comprises a read/write transducer, and the positional indicia preferably comprise AB and CD seams of ABCD servo dibit patterns on a recording surface. In this way, both gain and error offsets are compensated and a substantially linear position error signal can be generated.

These and various other features and advantages of preferred embodiments of the present invention will be apparent upon reading the following detailed description and upon review of the associated drawings.

DETAILED DESCRIPTION

Figure 1:
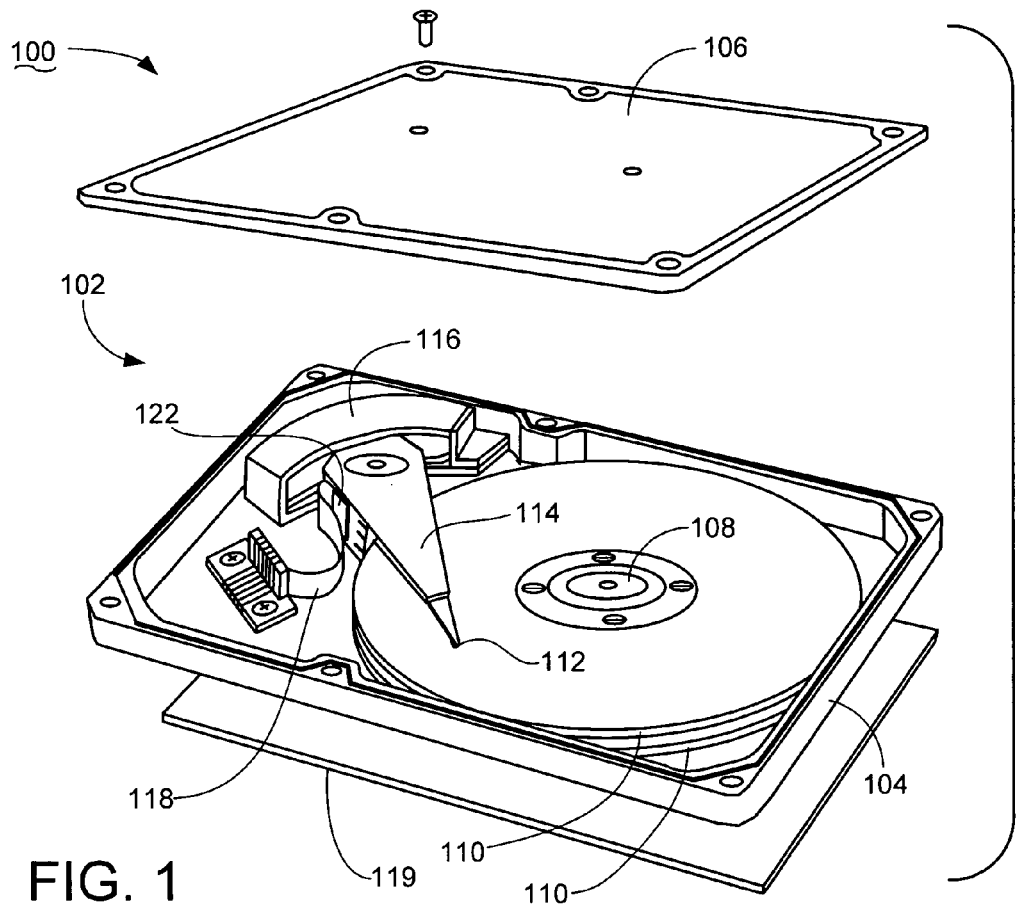
FIG. 1 is an exploded isometric view of an exemplary data storage device in which preferred embodiments of the present invention can be advantageously practiced.

FIG. 1 provides a top plan view of a data storage device 100. The drive 100 is provided to show an exemplary environment in which preferred embodiments of the present invention can be advantageously practiced. It will be understood, however, that the claimed invention is not so limited.

The device 100 includes a substantially sealed housing 102 formed from a base deck 104 and top cover 106. An internally disposed spindle motor 108 is configured to rotate a number of storage media 110. The media 110 are accessed by a corresponding array of data transducers 112. While FIG. 1 shows the use of two magnetic recording discs and four corresponding heads, other numbers of heads and discs (such as a single disc, etc.), as well as other types of media can readily be utilized in the device 100 as desired.

A head-stack assembly ("HSA" or "actuator") is shown at 114. The actuator 114 preferably rotates through application of current to a voice coil motor (VCM) 116. Controlled operation of the VCM 116 causes the transducers 112 to align with tracks (not shown) defined on the media surfaces to store data thereto or retrieve data therefrom.

A flex circuit assembly 118 provides electrical communication paths between the actuator 114 and device control electronics on an externally disposed printed circuit board (PCB) 119. The flex circuit assembly 118 preferably includes VCM signal paths to accommodate the application of current to the VCM 116, and I/O signal paths to accommodate the transfer of write data to the media 110 and readback data from the media 110, respectively.

Figure 2:
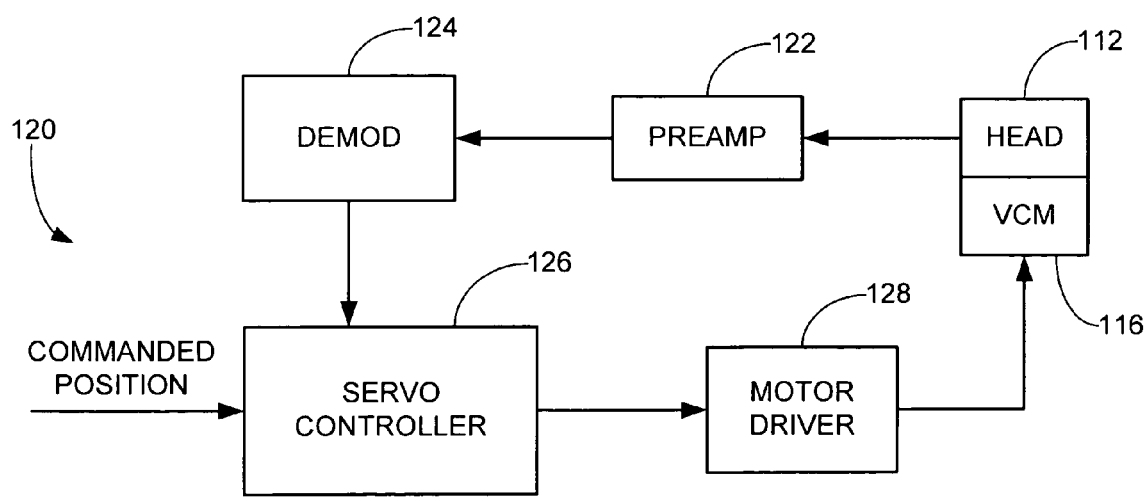
FIG. 2 provides a functional representation of a closed loop servo control circuit of the device of FIG. 1.

FIG. 2 provides a generalized functional block diagram for a closed loop servo control circuit 120 of the device 100. Preferably, embedded servo data are transduced from the media 110 by a selected transducer (head) 112 and provided to a preamplifier/driver (preamp) circuit 122. The preamp circuit 122 is preferably mounted to the side of the actuator 114, as shown in FIG. 1.

The preamp circuit 122 preamplifies and filters the readback signals from the transducer 112, and provides the processed servo data to a demodulation (demod) circuit 124. The demod circuit 124 is preferably disposed on the device PCB 119, and operates to detect and conditions the servo data, including application of automatic gain control (AGC) and conversion of the signals to digital form.

A servo controller 126 processes the digitized servo data to generate a current command signal that is supplied to a motor driver circuit 128. In response, the driver circuit 128 applies the appropriate current to the VCM 116 to position the transducer 112.

The servo controller 126 is preferably characterized as a programmable processor with associated servo code to direct the operation of the servo loop. The controller 126 generally operates in two primary modes, seeking and track following. Seeking generally involves controlled movement of the selected transducer 112 from an initial track to a destination track. Track following generally comprises operation of the controller 126 to maintain the selected transducer 112 over the center (or other commanded position) of a selected track in order to carry out data I/O operations with the track.

Figure 3:
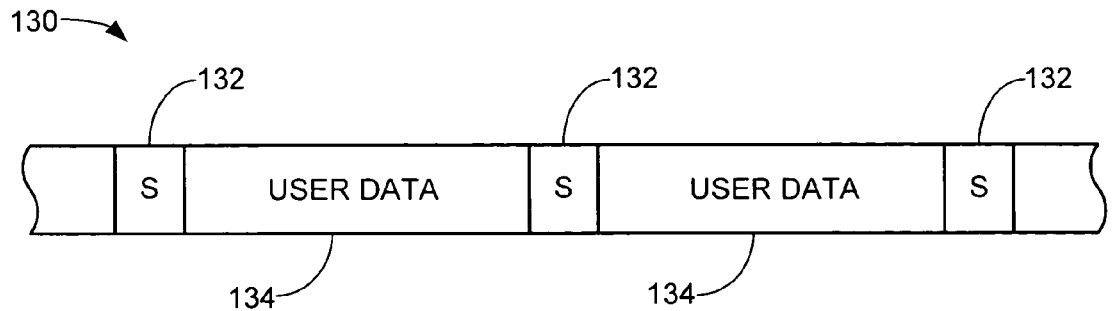
FIG. 3 illustrates a preferred arrangement for a data track of the device of FIG. 1.

FIG. 3 sets forth a generalized representation of a preferred format for a selected track 130 from the media 110. Servo data in the form of servo (S) fields 132 are embedded in spaced apart relation about the circumference of each recording surface. The servo data are preferably configured as servo wedges, which radially extend across the recording surfaces like spokes of a wheel. The servo data are preferably formed during device manufacturing, such as from the use of a servo track writer (STW) station or a self-servo writing operation.

User data are stored in intervening regions 134 between adjacent servo fields 132. Addressable data sectors (not separately shown) are defined in the regions 134 during a device formatting operation to store fixed amounts of user data (e.g., 512 bytes).

Figure 4:
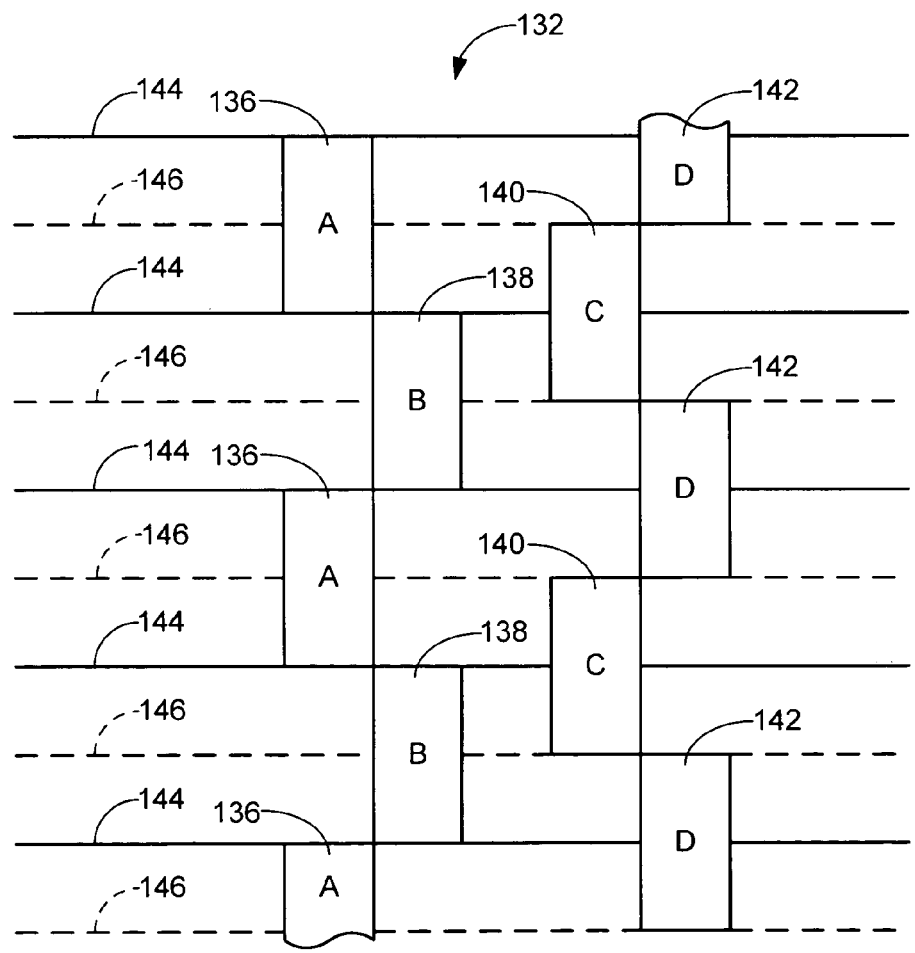
FIG. 4 sets forth a preferred arrangement of selected servo data from FIG. 3, preferably in the form of quadrature ABCD dibit patterns.

FIG. 4 shows a preferred arrangement of relevant portions of the servo data of FIG. 3 in the form of ABCD quadrature dibit patterns 136, 138, 140 and 142. It will be understood that the arrangement of FIG. 4 is merely exemplary in nature and any number of other arrangements can readily be used with preferred embodiments, as desired.

Generally, adjacent ones of the A and B patterns 136, 138 form AB seams 144 (shown in solid line fashion), and adjacent ones of the C and D patterns 140, 152 form CD seams 146 (shown in dashed line fashion). The seams 144, 146 provide signal transition boundaries detectable by the servo circuit 120 which enable the circuit to assess the actual radial position of the transducer 112. For reference, the seams 144, 146 are exemplary types of positional indicia for the control system, and it will be understood that other types and configurations of positional indicia can readily be used as desired. For purposes of FIG. 4 it will be noted that while all seam boundaries at A and B patterns are collectively referred to as AB seams 144, it will be appreciated that half of these boundaries can alternatively be referred to as BA seams (for those where the B pattern leads the A pattern). The same is true for the CD seams 146.

In a preferred embodiment, the patterns each comprise series of magnetic reversals of uniform length across the width of the pattern. In this way, a resulting transduced readback signal obtained as a read sensor of the transducer 112 passes over the respective pattern will generally comprise an oscillating signal of selected frequency. The magnitude of the oscillating signal will generally be determined in relation to the radial position of the read sensor with respect to the pattern.

Thus for example, as the read sensor passes along a given AB seam 144, the magnitude (or signal power, etc.) of the A pattern readback signal will generally be equal to the magnitude of the B pattern readback signal. At other locations for the read sensor, the distance from an adjacent AB seam 144 can generally be correlated to the respective different magnitudes obtained for the A and B pattern readback signals. The same is true for the C and D pattern readback signals obtained as the read sensor proceeds to read the respective C and D patterns 140, 142 in the vicinity of the sensor trajectory.

The magnitudes of the respective A, B, C and D readback signals can be combined in any number of known ways to provide an initial detected radial position of the transducer 112. Although not limiting, in a preferred embodiment a data track such as 130 in FIG. 3 is provided with a centerline along a selected AB seam 144 and with boundaries along adjacent CD seams 146 (i.e., the data track 130 is preferably provided with a radial width generally equal to the distance from one CD seam 146 to the next). However, in other preferred embodiments the data track locations and widths are decoupled from the servo seams so that the radial widths of the data tracks are set to any desired width and location with respect to the associated servo data, including the use of overlapping data tracks.

It will be noted that the ABCD patterns are generally limited to providing an intra-track detected position; for example, processing the magnitudes of the ABCD readback signals will generally give a distance indication from some selected point, such as a particular AB seam 144. Additional servo data such as in the form of Gray code provides inter-track positioning (addressing), so that as the transducer processes the servo data of a given servo field 132 (FIG. 2), an overall detected position of the transducer 112 with respect to the medium 110 will be generated by the servo controller 126.

Figure 5:
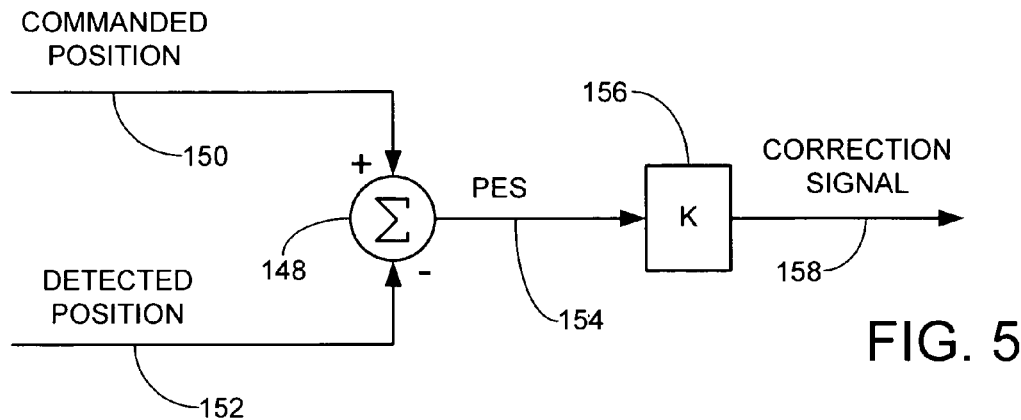
FIG. 5 shows a simplified control diagram of the servo circuit of FIG. 2 to generally illustrate a preferred manner in which a position error signal (PES) is generated from the patterns of FIG. 4.

As shown in FIG. 5, a summing junction 148 combines a commanded (desired) position for the transducer 112 on path 150 with the detected position on path 152 to output a position error signal (PES), path 154. The PES generally indicates a radial positioning distance error for the transducer, and the servo circuit 120 generally operates to adjust the current applied to the VCM 116 to reduce this error. For example, as shown in FIG. 5, the PES on path 154 is combined with a gain K of block 156 to provide a correction signal on path 158. The current output from the motor driver 128 can then be adjusted in relation to this correction signal. Other and more complex forms of signal processing of the PES can readily be applied, however, depending on the requirements of a given application.

Figure 6:
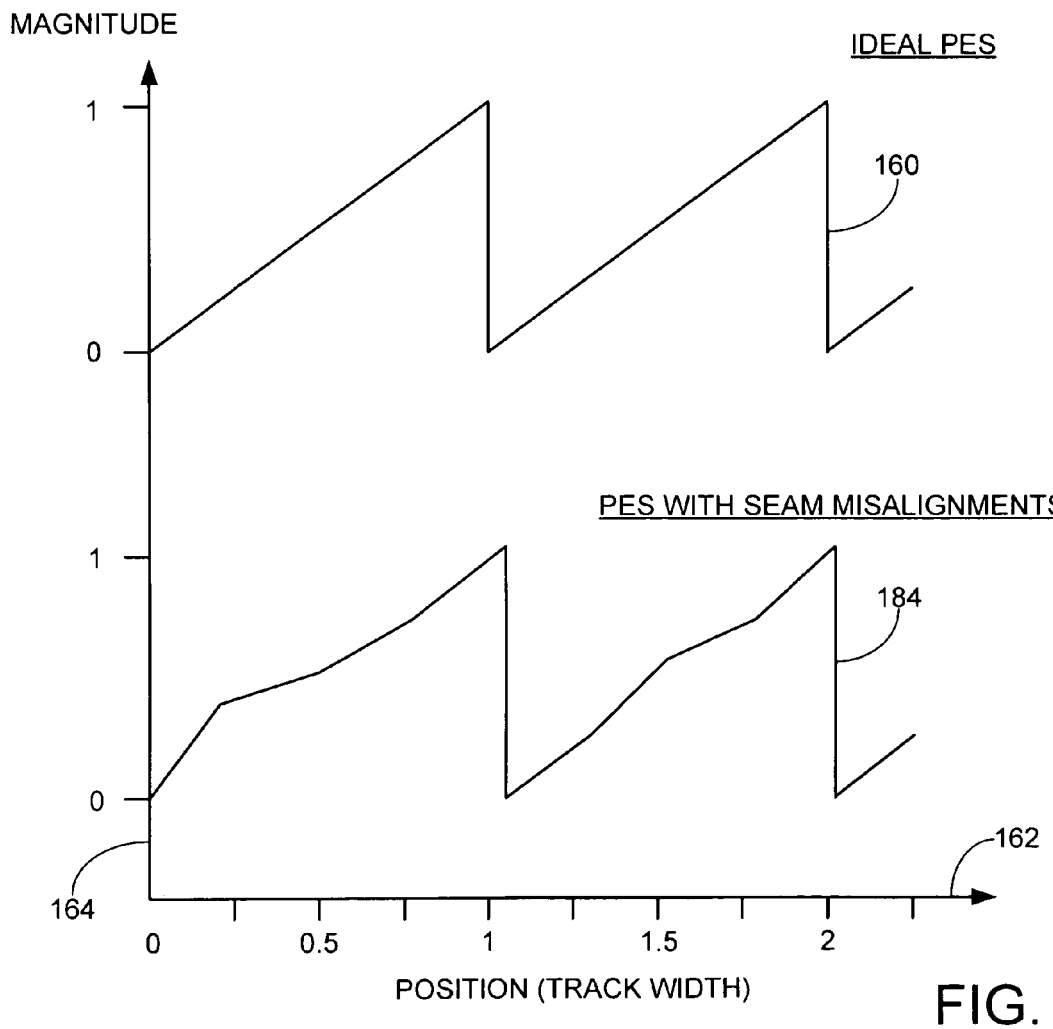
FIG. 6 graphically represents an ideal PES signal and a nonlinear PES signal affected by positional indicia (servo seam) misalignments.

FIG. 6 shows a graphical representation of an ideal PES curve 160, plotted against a position (track width) x-axis 162 and a magnitude y-axis 164. The ideal PES curve 160 has a magnitude that increases in a substantially linear fashion from a minimum value to a maximum value (normalized values of 0 and 1) as the transducer 112 is swept from one track boundary to the next. The PES curve 160 is generated from the ideally sized and placed patterns 136, 138, 140 and 142 of FIG. 4.

Real-world effects such as manufacturing tolerances, vibration, etc. will generally tend to produce written in variation (repeated run out) in the sizing and placement of the servo patterns, so that the actual locations of the respective seams may be misaligned somewhat from the ideal positions shown in FIG. 4.

Figure 7:
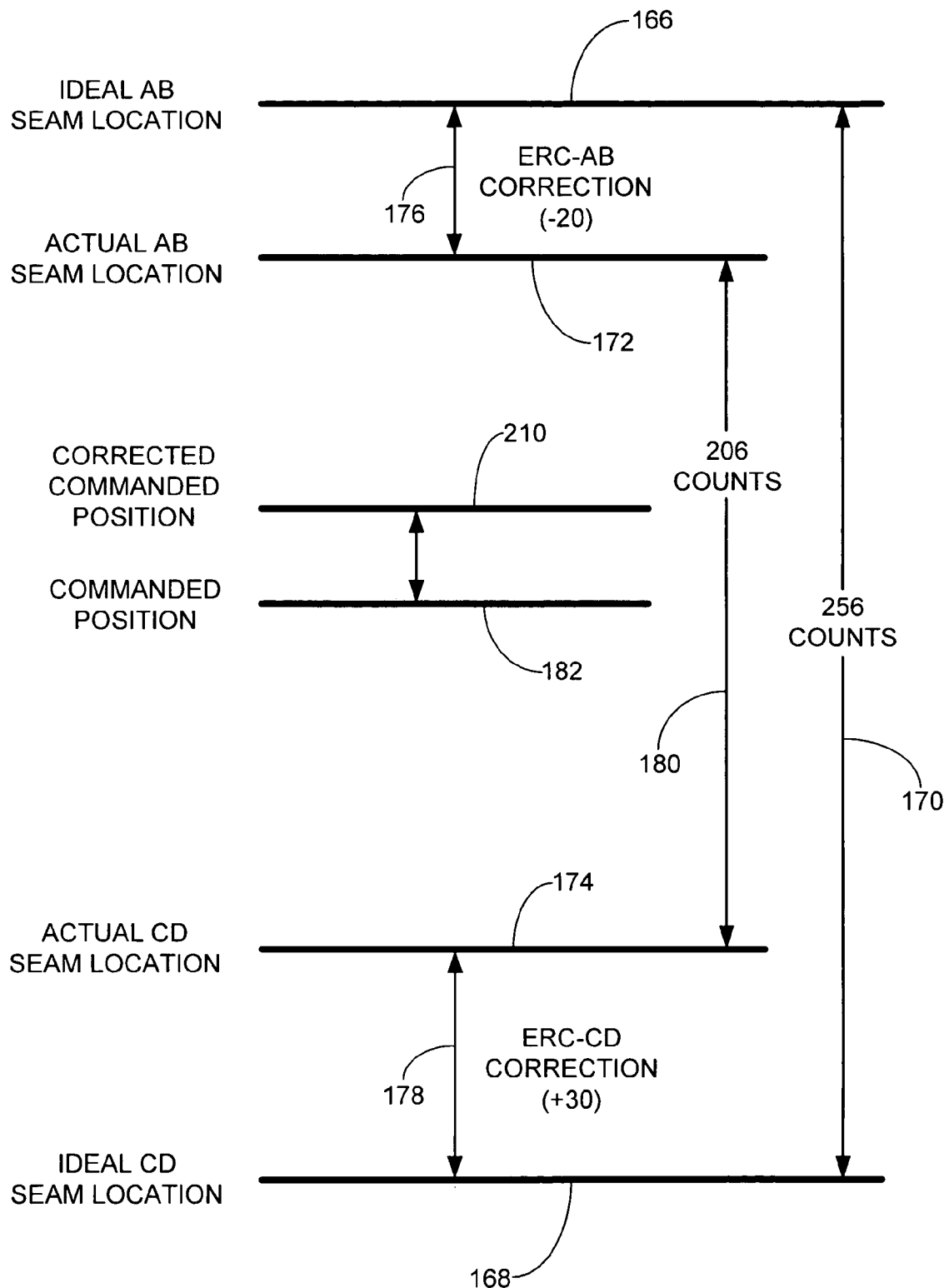
FIG. 7 diagrammatically illustrates exemplary ideal and actual servo seam locations for a selected set of dibit patterns of the device of FIG. 1.

FIG. 7 shows an ideal AB seam location at 166 and an ideal CD seam location at 168, representative of where the respective seams "should" be on the associated medium. The gain of the servo circuit 120 is preferably configured to provide a total of 256 counts, or increments, between the respective ideal seams 166, 168, as indicated at 170.

As a result of the foregoing variation effects, however, actual locations of the AB and CD seams are misaligned from the ideal locations, as indicated by actual AB seam 172 and actual CD seam 174, respectively.

Embedded runout correction (ERC) values can be used to quantify the error distances between the ideal and actual seam locations. For example, An ERC-AB correction value of −20 is identified at 176 and an ERC-CD correction value of +30 is indicated at 178. Those skilled in the art will recognize that such ERC values can be obtained in any number of ways, such as disclosed in U.S. Pat. No. 6,549,362, assigned to the assignee of the present application. The ERC values allow the servo circuit to trace a substantially circular path at each seam around the medium, instead of following the variations of the written in error.

Nevertheless, discontinuities can still arise as a result of seam misalignments and these discontinuities can affect the ability to generate a linear PES. For example, when a servo circuit servos between the respective actual AB and CD seams 172, 174, the circuit gain may still be set to expect 256 counts (or some other number) between the actual locations of the seams. But as shown at 180, the real distance between the actual seams 172, 174 may be different (in this case, reduced to a distance equal to 206 counts).

Because the seam misalignments in FIG. 7 "squeeze" this portion of the servo data, each of the 256 counts between seams 172, 174 will be smaller than a "normal" count increment size. This can adversely affect the ability of the servo circuit to position the transducer 112 at a commanded position between the seams, such as indicated at 182.

It follows that as a transducer 112 is swept across a data track, a nonlinear PES will be generated such as represented at 184 in FIG. 6. Unlike the ideal PES curve 160, the nonlinear PES curve 184 is segmented and does not exactly line up with the associated ideal track boundaries. This can degrade the ability of the servo circuit 130 to precisely position the transducer 112 such as during data I/O operations.

When the device 100 is track following between a selected AB seam such as 172 and a selected CD seam such as 174, the servo circuit 120 will have at least four pieces of information at its disposal: the two closest ERC seam values (in this case the ERC-AB value 176 and the ERC-CD value 178), the commanded position 182, and the reported PES (path 154 in FIG. 5). In accordance with preferred embodiments, these pieces of information are preferably used in a feedforward manner to generate a corrected PES that more closely resembles the ideal PES of curve 160.

Figure 8:
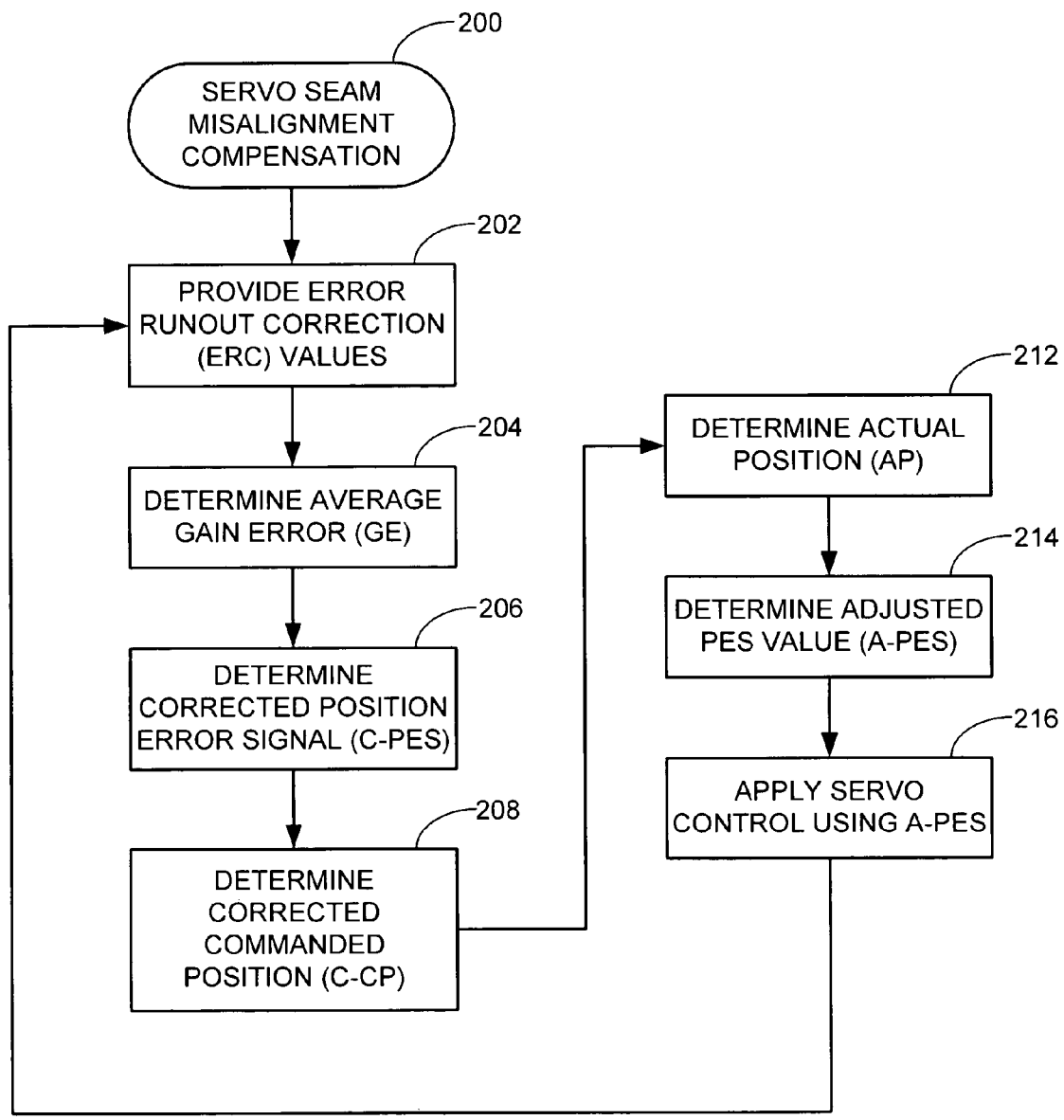
FIG. 8 sets forth a flow chart for a SERVO SEAM MISALIGNMENT COMPENSATION routine, generally illustrative of steps carried out in accordance with preferred embodiments of the present invention.

FIG. 8 sets forth a SERVO SEAM MISALIGNMENT COMPENSATION routine 200, illustrative of steps carried out in accordance with preferred embodiments of the present invention. The routine of FIG. 8 preferably represents programming steps carried out by the servo controller 126 during track following operation of the device 100, although such is not limiting.

At step 202, the ERC values (e.g., 176, 178) for the associated seams are first determined. Such values can be retrieved from servo memory or read from the respective servo fields 132. In a preferred embodiment, ERC values are obtained and stored for each seam (e.g., ERC-AB, ERC-CD, ERC-BA, ERC-DC, etc.) at each servo field wedge.

An average gain error is next determined at step 204. The gain error, referred to herein as GE, is preferably obtained in accordance with the following relationship:

$$GE = (256 + ERC\text{-}AB - ERC\text{-}CD)/256 \quad (1)$$

It will be noted that the ERC-AB and ERC-CD values in equation (1) are generic in form; that is, these refer to the ERC values for the closest two seams that respectively involve the A and B patterns and the C and D patterns. The value 256 appears in equation (1) as the expected count interval between the respective seams. The gain error can alternatively be calculated in other ways to accommodate systems that use some other measure or indicator of the distance between the seams.

Once the average gain error value GE has been determined, the routine of FIG. 8 preferably continues at step 206 to determine a corrected PES value; that is, a correction of the PES value obtained by the servo circuit in accordance with FIG. 5. The corrected PES value, C-PES, is preferably obtained by multiplying the PES by the average gain error GE as follows:

$$C\text{-}PES = (PES)(GE) \quad (2)$$

At step 208, the routine next generates a corrected commanded position, C-CP. This is preferably obtained by multiplying the commanded position, CP, by the average gain error GE and subtracting the value of ERC-AB, as follows:

$$C\text{-}CP = (CP)(GE) - ERC\text{-}AB \quad (3)$$

The corrected command position C-CP is generally represented in FIG. 7 at line 210, although it will be understood that the C-CP position may be above or below the initial commanded position CP 182 depending on the respective GE and ERC-AB values.

At step 212, an actual position AP of the transducer 112 is next determined in relation to the corrected PES value C-PES and the corrected command position C-CP, such as in accordance with the following relation:

$$AP = C\text{-}PES + C\text{-}CP \quad (4)$$

The actual position AP is generally representative of the actual position of the transducer 112 with respect to the medium 110, and is independent of ERC values and seam misplacements.

Having now obtained an indication of the actual position AP of the transducer 112, the routine next preferably generates an actual position error signal A-PES at step 214 in relation to the actual position AP of the transducer and the initial commanded position CP. This is preferably carried out as follows:

$$A\text{-}PES = AP + CP \quad (5)$$

The A-PES value is fed forward into the servo circuit at step 216 to generate a correction value to control the position of the transducer 112. As shown in FIG. 8, at this point the routine preferably returns to step 202 for evaluation of the next servo field 132. In an observer based servo system, estimated actual PES values can be readily obtained in accordance with the foregoing discussion in the intervals between adjacent servo fields 132.

The routine of FIG. 8 advantageously operates to substantially eliminate the effects of both gain errors and offsets resulting from misplaced seams. The resulting A-PES profile using the routine of FIG. 8 will substantially match the ideal curve 160 in FIG. 6, and will provide a properly tuned servo gain for each seam interval in each servo wedge.

Numerous alternatives are readily contemplated, depending on the requirements of a given application. For example, the foregoing exemplified approach generally assumes that gain error will be substantially linear over the interval between adjacent AB and CD seams. Depending on the PES detection system employed, however, this may not necessarily be the case.

In an alternative approach wherein the system just uses the AB bursts to servo in the vicinity of the AB seams and just uses the CD bursts to servo in the vicinity of the CD seams, there may be little or no gain error at these boundary locations. However, at the mid-point between the respective AB and CD seams, the gain error may be twice the average gain error as measured above. Thus, a gain function that varies with radial position can readily be formulated and used in place of the linear function expressed above. Other alternatives can readily be implemented as well.

Figure 9:
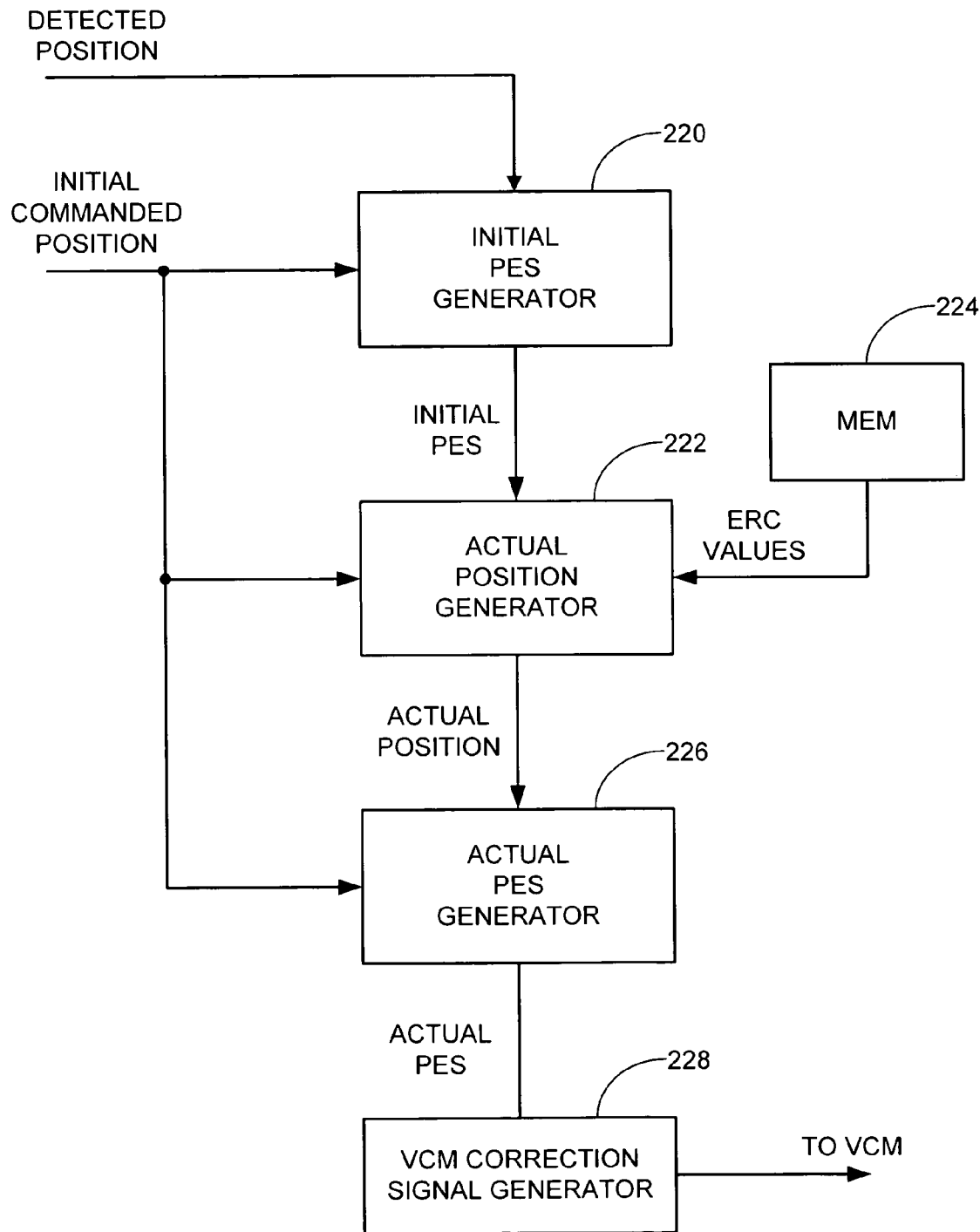
FIG. 9 provides a functional block diagram of the servo circuit of FIG. 2 configured to operate in accordance with the routine of FIG. 8.

FIG. 9 provides a generalized functional block diagram of the servo circuit 120 configured to operate in accordance with the routine of FIG. 8. Generally, a PES generation block 220 generates an initial PES value such as described above in FIG. 5 from a detected position and a commanded position for the transducer 112.

An actual position generator 222 uses the initial PES value, the commanded position and the ERC values from a memory location 224 to generate the actual position (AP) of the transducer 112. Preferably, as discussed above this includes the sequential calculation of average gain error (GE), corrected position error (C-PES), and corrected commanded position (C-CP).

An actual PES generator 226 next combines the actual position (AP) and the actual commanded position to generate an actual PES with linear characteristics as set forth in FIG. 6. The actual PES is then used to generate a correction signal by block 228 which is fed to the VCM 116 to adjust the position of the actuator.

It will be appreciated that numerous changes can be made to the foregoing preferred embodiments. The positional indicia are not limited to seams between dibit patterns on a storage medium, but can be any number of different types of positioning indicia in a control system used to position a control object.

For purposes of the appended claims, the recited "first means" will be understood to correspond to the servo circuit 120 which operates in accordance with the routine of FIG. 8 to compensate for a positional indicia misalignment as discussed herein.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A method comprising using a controller circuit to determine an actual position of a control object in relation to a corrected commanded position of the control object determined responsive to a gain error, an actual commanded position, and a runout compensation value indicative of a positional error distance between an ideally located positional indicia and an actual location of positional indicia.

2. The method of claim 1, further comprising a step of generating an actual position error of the control object in relation to the actual position and the actual commanded position.

3. The method of claim 2, further comprising a step of moving the control object in relation to the actual position error.

4. The method of claim 1, wherein the actual position of the control object is further determined in relation to a corrected position error of the control object determined responsive to the gain error and an actual position error.

5. The method of claim 4, wherein the gain error is determined in relation to said embedded runout compensation value.

6. The method of claim 4, wherein the positional indicia comprise servo dibit patterns on a storage medium.

7. The method of claim 6, wherein the positional indicia comprises a servo seam at the boundary between adjacent servo dibit patterns.

8. The method of claim 1, wherein the gain error is determined in relation to at least one embedded runout correction value indicative of positional error distance between an ideally located positional indicia and an actual location of positional indicia.

9. The method of claim 1, wherein the control object comprises a transducer of a data storage device, and the actual position comprises an actual position of the transducer with respect to an associated data storage surface adjacent the transducer.

10. The method of claim 1, wherein responsive to receipt of the actual commanded position the controller circuit sequentially generates the corrected position error, the commanded position, and the actual position, and then moves the control object responsive to the actual commanded position and the actual position.

11. An apparatus comprising:
a control object; and
a servo circuit configured to move the control object to a received commanded position by determining the actual position of the control object in relation to a corrected commanded position generated responsive to a gain error, a runout correction value, and said received commanded position.

12. The apparatus of claim 11, wherein the servo circuit further operates to generate an actual position error of the control object in relation to the actual position and the received commanded position.

13. The apparatus of claim 12, wherein the servo circuit further moves the control object to reduce said actual position error.

14. The apparatus of claim 12, wherein the servo circuit further operates to generate the gain error in relation to at least one embedded runout correction value indicative of positional error distance between ideally located positional indicia and an actual location of said positional indicia.

15. The apparatus of claim 14, characterized as a data storage device and wherein the positional indicia comprise servo dibit patterns on a storage medium of the device.

16. The apparatus of claim 15, wherein the positional indicia comprises a servo seam at the boundary between adjacent servo dibit patterns.

17. The apparatus of claim 11, wherein the control object comprises a transducer of a data storage device, and the actual position comprises an actual position of the transducer with respect to an associated data storage surface adjacent the transducer.

18. The apparatus of claim 11, wherein the servo circuit comprises a programmable processor with an associated programming routine used to determine the actual position of the control object.

19. A method comprising receiving a commanded position indicative of a desired position for a control object, and then using a controller to generate a corrected commanded position in relation to the commanded position and a gain error and to move the control object to the commanded position using the corrected commanded position.

20. The method of claim 19, wherein the controller further generates the corrected commanded position in relation to a runout correction value indicative of a positional error distance between an ideally located positional indicia and an actual location of positional indicia.

* * * * *